United States Patent [19]

Arques

[11] Patent Number: 4,985,619

[45] Date of Patent: Jan. 15, 1991

[54] PHOTOSENSITIVE MATRIX WITH TWO DIODES OF THE SAME BIAS AND ONE CAPACITOR PER PHOTOSENSITIVE DOT

[75] Inventor: Marc Arques, Grenoble, France

[73] Assignee: Thomson-CSF, Puteaux, France

[21] Appl. No.: 385,086

[22] Filed: Jul. 26, 1989

[30] Foreign Application Priority Data

Jul. 29, 1988 [FR] France .................. 88 10265

[51] Int. Cl.$^5$ .............................................. H04N 3/14
[52] U.S. Cl. .............................. 250/208.1; 358/213.31
[58] Field of Search .................. 250/578, 211 J, 208.1;
357/24 LR, 30 H; 358/213.11, 213.15, 213.16, 213.22, 213.23, 213.31

[56] References Cited

U.S. PATENT DOCUMENTS 4,200,892  4/1980  Weimer .......................... 358/213.31
4,906,855  3/1990  Berger et al. .................. 358/213.23

FOREIGN PATENT DOCUMENTS 2593987  8/1987  France .

*Primary Examiner*—Edward P. Westin
*Assistant Examiner*—George C. Beck
*Attorney, Agent, or Firm*—Oblon, Spivak, McClelland, Maier & Neustadt

[57] ABSTRACT

Each photosensitive dot of the photosensitive matrix disclosed is formed by one capacitor and two diodes. The capacitor is connected between a row conductor and a common floating node. A photodiode is connected between the floating node and a reference voltage source which biases it in reverse. A small-sized reading diode, hence one with low capacitance, is connected between the floating node and a column conductor. This structure enables the making of a matrix having a reduced column capacitance. It therefore enables a more efficient transfer of charges from the photodiodes to the reading circuit connected at the end of a column.

5 Claims, 2 Drawing Sheets

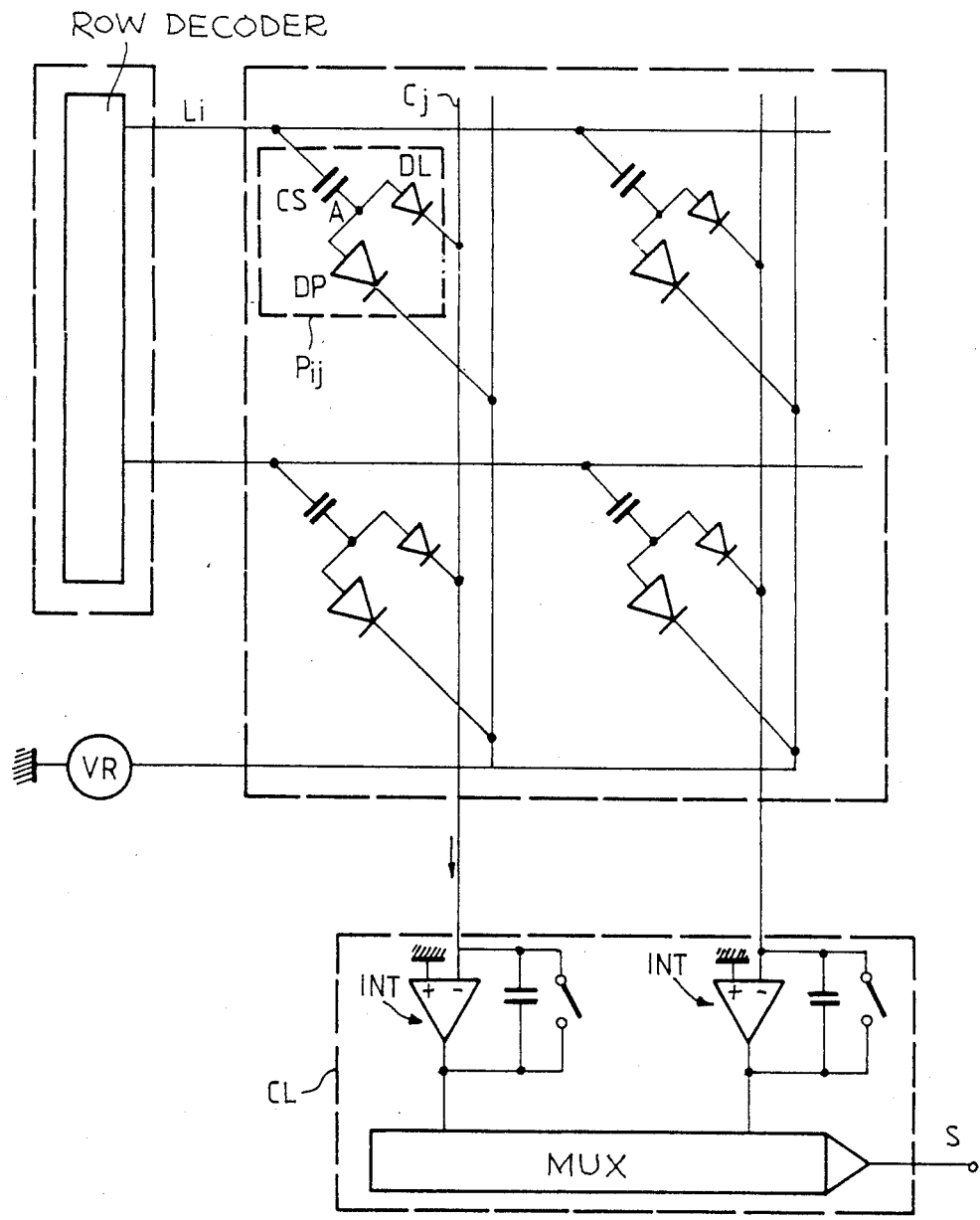
FIG_1

FIG_2
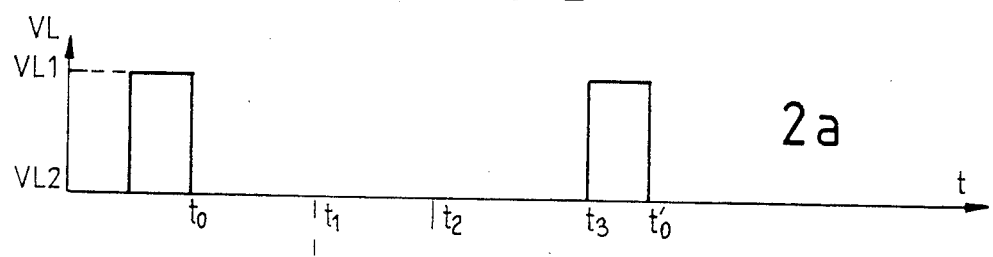
2a
2b
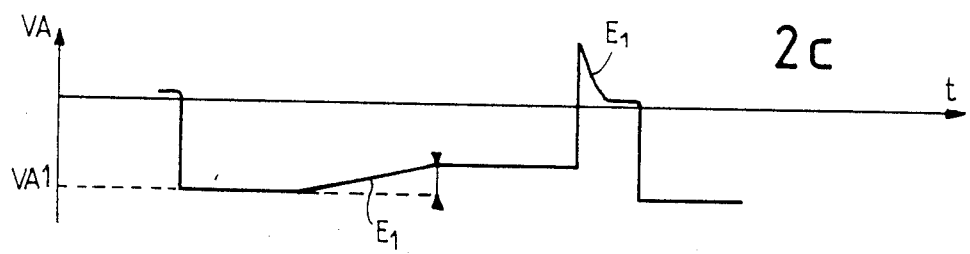
2c
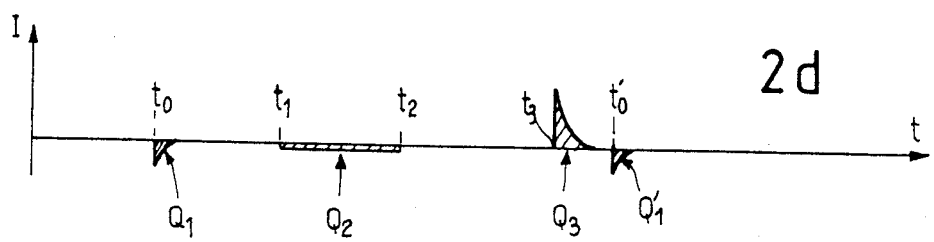
2d

PHOTOSENSITIVE MATRIX WITH TWO DIODES OF THE SAME BIAS AND ONE CAPACITOR PER PHOTOSENSITIVE DOT

BACKGROUND OF THE INVENTION

1. Field of the Invention

The invention concerns matrices of photosensitive elements.

2. Description of the Prior Art

A standard way to make matrices of photosensitive elements is to provide for a network of row conductors and a network of column conductors with a respective photosensitive element at each intersection of a row and a column. A row of photosensitive elements, for which it is desired to know the output electrical signals, is selected through the network of rows. A respective output signal for each of the elements of the selected row is read through the network of column conductors.

The French patent No. 86 00716 describes a photosensitive matrix comprising a network of photosensitive dots in which each photosensitive dot has charge-storage capacitor in series with a photosensitive element, the unit being connected between a row conductor and a column conductor. The photosensitive element may be a PIN photodiode with three layers (P type semiconductor layer, intrinsic layer I and N type layer).

Charges are generated in the photodiode by the illumination of the photosensitive dot. They collect or accumulate at the (floating) node between the photodiode and the capacitor. They are read through the application, to the row conductor, of a pulse voltage in a direction that forward biases the photodiode (whereas it was reverse biased during the stage of accumulation). Charges, in a quantity corresponding to the charges that have collected, are then transferred from the floating node to the column (or conversely from the column to the floating node). The reading operation consists in measuring this movement of charges.

After the end of the reading pulse, the photodiode goes into reverse bias for a new stage of illumination and integration of charges.

However, the potential of the floating node no longer has the value that it had at the start of the integration stage. It is therefore not possible to start a new integration stage without setting this potential of the floating node at a well-determined starting value.

The reading stage is therefore followed by a stage for resetting the potential of the floating node.

The resetting is done by the illumination of the photodiode. It is therefore necessary to provide for an illumination source and control means synchronized with the means for reading the photosensitive matrix, to do a resetting after each reading stage.

An aim of the present invention is to make a photosensitive matrix wherein the capacitance of a column of photosensitive dots is reduced as far as possible so as to reduce the reading noise during the transfer of charges from a photosensitive dot to the column.

Another aim of the invention is to propose a matrix which is technologically easy to make.

Another aim of the invention is to reduce the dark currents which are injected into the column by the photosensitive dots of this column, even when these dots are not illuminated.

Another aim of the invention is to improve the efficiency of collection of the photocharges by the photosensitive diodes of the matrix.

SUMMARY OF THE INVENTION

According to the invention, there is proposed a matrix of photosensitive dots comprising a network of photosensitive dots arranged in rows (at least one row) and columns (at least one column), each photosensitive dot being located at the intersection of a row and a column, wherein each photosensitive dot comprises two diodes and one capacitor connected to a floating node, the capacitor being connected between a row conductor and the floating node, a first diode, called a reading diode, being connected between the common floating node and a column conductor to enable the transfer, between this column conductor and the floating node, of a quantity of charges generated on the floating node by the illumination of the photosensitive dot, and a second diode, called a photosensitive diode, being connected between the floating node and a conductor connected to a source of reverse bias voltage, to generate, when it is illuminated, electrical charges on the floating node, the diodes being connected with the same bias to the floating node.

The expression "the diodes being connected with the same bias to the floating node" implies that either both the diodes have their anode connected to the floating node or both the diodes have their cathode connected to the floating node.

The source of reverse bias voltage is, in principle, a fixed potential source. This source keeps the photodiode in reverse bias, in principle throughout the reading charges integration cycle.

In certain cases, the reading will be done by the application of a reading pulse on a row, with all the columns being at a reference potential. However, in other cases, a reading pulse having one sign with respect to the reference potential of the columns could be applied to a row and, simultaneously, a reading pulse having the opposite sign could be applied to a specified column conductor, connected to the photosensitive dot for which it is sought to read the charges, the other column conductors being kept at the reference potential. This arrangement makes it easy to select a column of photosensitive dots.

The working of the device does not depend on the level of bias voltage of the row conductor during the illumination stage. It depends only on the amplitude and on the sign of the reading pulse. It can be seen to it that the level of bias voltage of the row conductor is chosen in such a way that, during both the reading stage and the illumination stage, the voltage at the terminals of the capacitor continues to have the same sign. Under these conditions, the capacitor can be made in the form of a reverse biased diode junction.

The reading diode will have a far smaller dimension than the photodiode and, consequently, a far smaller capacitance. The result of this is that the overall capacitance, as seen from the column conductor side, will be small.

The invention can be applied to all sorts of photosensitive matrices, including those that are used in radiology and, therefore, have a scintillator (gadolinium oxide, cesium iodide etc.) to convert X-radiation (or gamma or neutron radiation) into light radiation in the band of wavelengths to which the photosensitive diodes are sensitive.

The invention is particularly suited to an embodiment wherein the photosensitive dots are made by superimposing layers of amorphous silicon.

Among the advantages anticipated from the present invention, for these advantages are essential to the quality of the matrices made, we might mention:

low capacitance of the columns of photosensitive dots;

high reading speed;

efficient uncoupling between the photosensitive dots of neighboring rows or columns;

reduction in stray noise at the reading instant. In prior art systems, this noise could be generated by the action of making the photosensitive diode conductive in forward bias. In the present case, in principle, the photodiode remains reverse biased even during the reading stage.

BRIEF DESCRIPTION OF THE DRAWINGS

Other features and advantages of the invention will appear from the reading of the following detailed description, made with reference to the appended drawings, of which:

FIG. 1 shows a matrix of photosensitive dots according to the invention;

FIG. 2 shows the timing diagram of variation in the potentials on the row conductor (diagram 2a); a time window of illumination of the matrix (diagram 2b); the diagram of variation of the potentials on the floating common node (diagram 2c); and the current flowing in the column conductor (diagram 2d).

DESCRIPTION OF A PREFERRED EMBODIMENT

FIG. 1 shows a simplified diagram of a matrix of photosensitive dots according to the present invention.

The matrix comprises a network of rows and columns of photosensitive dots Pij.

Each row comprises a row conductor Li to which the photosensitive dots of this row are connected. The row conductor Li is used to give a voltage pulse for the reading of the dots of this row. The row conductors are connected to a row decoder DEL, capable of selecting a determined row for which it is sought to read the dots. The row decoder DEL permits the transmission of reading and resetting pulses to the conductors Li of the selected row.

Each column has a column conductor Cj to which the photosensitive dots of this column are connected. The column conductor Cj is connected to a circuit CL for reading the charges generated by the photosensitive dot Pij located at the intersection between this column and the selected row.

The reading circuit reads the charges injected into the column by a photosensitive pixel while, at the same time, keeping the column at a determined reference potential (which may be the ground potential).

In one exemplary embodiment, the reading circuit has an integrator INT for each of the columns of dots, and a multiplexer MUX receiving the outputs of the integrators to give, successively, at its output S, signals representing the illumination of the successive dots of the designated row.

In other cases, the reading circuit could be a charge transfer circuit, and the multiplexer could be a charge transfer shift register.

According to the invention, each photosensitive dot Pij comprises two diodes and one capacitor connected to a common floating node A:

DP (diode, the main characteristic of which is that it is photosensitive);

DL (reading diode enabling the transfer of charges from the floating node A to the column conductor Cj);

CS (capacitor for storage of the charges generated by the illumination).

The photosensitive diode DP is connected between the floating node A and a bias voltage source, setting up a constant potential VR, such that the photodiode remains reverse biased throughout the working cycle. The reading diode DL is connected between the column conductor Cj and the floating node A, and the capacitor CS is connected between the row conductor Li and the floating node.

More precisely, in the example of FIG. 1, it is the anode of the photosensitive diode DP and the anode of the reading diode DL that are connected to the floating node. However, in an equivalent way, and provided that the relative directions of the potentials brought into play at the row and column conductors are reversed, it is possible to provide for a reversal of the anodes and cathodes of both the diodes at the same time. In this case, the cathode of the photosensitive diode and the cathode of the reading diode would be connected to the floating node. In any case, the diodes DP and DL have an electrode of the same type connected to the floating node.

The diode DP has a relatively large area so that its sensitivity can be sufficient. The reading diode is far smaller so that its capacitance can be very small as compared with that of the diode DP and as compared with the value of the capacitor CS, so that the total capacitance of the series-mounted unit comprising the reading diode and the photodiode or the reading diode and the capacitor CS can be very small.

The capacitance of the column of dots will be all the smaller (which is advantageous) as the capacitance of the reading diode is small; this is an incentive to choosing a small-sized diode for DL.

WORKING OF THE DIAGRAM OF FIG. 1

To simplify the explanations, it shall be assumed that the capacitance of the diodes DL and DP is negligible as compared with that of the storage capacitor CS. If this were not the case, the numerical values of potentials and potential variations indicated during the explanations would be modified, but the working principle would remain valid.

Drops in potential in the diodes shall also be overlooked when they are forward biased, although these voltage drops are of the order of 0.5 volts.

Finally, it shall be assumed that the reading circuit connected to the columns keeps their potential at a null reference value.

FIG. 2 shows timing diagrams which make it possible to illustrate the working.

The diagram 2a represents the reading pulses applied to a row conductor. The diagram 2b represents a time window during which the photosensitive matrix is illuminated. For the rest of the time, it is kept in darkness (working by flashes of illumination). The diagram 2c represents the variations in potential of the floating node A during an illumination and reading cycle. The diagram 2a represents the current applied to an output integrator at the end of a column.

The periodic working cycle lasts between an instant t0 defining the end of a first reading pulse and an instant t'0 defining the end of the next reading pulse.

At the outset, just before the instant t0, the initial state is as follows:

the potential VL at the row conductor Li has a positive value VL1, for example +4 volts; this value is the value imposed during a reading pulse, the initial state being the one that exists at the moment when a reading pulse ends;

the potential VA at the node A has a value which is practically null (in fact, slightly positive and equal to the drop in forward voltage of the reading diode DL).

It shall be seen that this initial state is actually the one which will exist at the end of the reading cycle which will now be described.

At the instant t0, the row conductor Li of a selected row goes to a potential VL2, called a bias potential of the row conductor, for example 0 volt. It will be seen that it may be different from zero.

The potential of the node A, which is initially very close to zero, is pulled by capacitive influence to a value VA1 which is proportionate to VL2−VL1, the ratio of proportionality being Cs/(Cs+Cdp+Cdl) where Cs, Cdp, Cdl are the respective capacitances of the capacitor CS, the (reverse biased) diode DP and the (also reverse biased) diode DL.

$$VA1 = (VL2 - VL1)Cs/(Cs + Cdp + Cdl)$$

A charge Q1 then flows in the column conductor connected to the floating node by the reading diode DL. This charge Q1 is the product of the capacitance Cdl of the reading diode and the variation in voltage of the node A (the column conductor having a reference voltage which, it is assumed, does not vary and which is, in principle, zero volt).

$$Q1 = (VL2 - VL1)Cdl.Cs/(Cs + Cdp + Cdl)$$

This charge is low and flows away rapidly. The diagram 2d, which represents the current flowing in the column conductor, shows the outflow of the charge Q1 starting from the instant t0. The charge is the integral of the current.

The potential of the node A then remains at its value VA1, the diodes DP and DL being both reverse biased, and the node A therefore remaining in a floating state.

Between an instant t1 and an instant t2, the photosensitive matrix receives an illumination. For the rest of the time it is kept, in principle, in darkness. However, it will be seen that, in certain cases, the illumination may be continuous from t0 to t'0.

The illumination causes a generation of photoelectric charges in the photodiode. The positive charges collect at the floating node, given the reverse bias of the photodiode DP. They make the potential rise with a slope which is all the steeper as the illumination is greater.

It should be noted that were it to be the cathodes of the diodes that were connected to the floating node, the directions of the potentials would be reversed, and the negative charges would collect at the floating node. The potential of the node A would fall.

At the instant t2, when the illumination ends, the potential VA of the node A has reached an intermediate value between its starting potential VA1 and the reference potential of the columns. It cannot rise further, otherwise the reading diode would become conductive and the supplementary or additional charges would get discharged into the column.

If the quantity of charges generated by the photodiode is QD, a charge Q2 = QD.Cdl/Cs+Cdp+Cdl) flows in the column Cj, between the instants t1 and t2, but this charge is low in view of the low value of the capacitance Cdl as compared with Cs and Cdp. Moreover, this charge is spread out in time over the duration t1, t2.

After interruption of the illumination, the potential remains constant, the diodes DP and DL being reverse biased.

At the instant t3, a reading pulse is applied. This reading pulse will last up to the end of the cycle, i.e. up to the instant t'0.

The reading pulse takes the row potential from the bias value VL2 to the value VL1.

The potential of the node A goes from a value VA (reached at the instant t2 and depending on the illumination received by the photosensitive dot between t1 and t2) to a value VA+(VL2−VL1)Cs/(Cs+Cdp+Cdl), that is, a value having little difference with respect to VA+VL2−VL1. During this rise, a charge Q'3, equal to −Q1 (it is recalled that Q1 is the charge flowing immediately after t0) flows in the column conductor.

The new value of the potential of the node A is positive or null and makes the reading diode DL, connected to the null reference potential of the column Cj, conductive.

The charges that have collected at the node A can then get discharged into the column conductor.

The quantity of charges Q''3, then injected into the column towards the reading circuit, is:

$$Q''3 = (Cs + Cdp)QD/(Cs + Cdp + Cdl).$$

The total charge that flows in the column conductor during the row pulse is Q3=Q'3+Q''3, i.e. given the fact that Cdl is very small as compared with the other capacitances:

there is little difference between Q3 and (−Q1+QD), where QD is the useful charge generated in the photodiode by the illumination.

When the reading pulse ends on the row Li, a charge Q'1 = +Q1 again flows in the column conductor.

If the reading circuit integrates the current arriving from the instant t3, just after the removal of the charge Q'1, the total charge integrated will be QD, i.e. it will really correspond to the useful signal sought.

It is ascertained that, at the instant t'0, the potential conditions are actually the same as at the instant t0: the potential of the node A is really equal to zero or, more precisely, to the forward conduction threshold voltage of the reading diode DL.

It may be noted that the reading diode DL should be smaller than the photodiode for its capacitance to be negligible, but it could quite possibly be photosensitive like the photodiode DP. It then contributes, without any difficulty, to the generation of photocharges. For the practical making of the device, the reading diode therefore does not have to be masked by layers that are opaque to light.

The total capacitance of a column Cj is appreciably equal to N times the capacitance Cdl of a reading diode DL, if there are N photosensitive dots attached to this column. This is clearly far less than would be the case if the photodiodes DP were to be directly connected to the column conductor to serve as reading diodes.

During the reading of a row, i.e. during the row pulse emitted on this row, the column conductor receives not only the useful charge Q3, corresponding to this row, but possibly also fractions of charge Q1 and Q2 corresponding to the other rows. However, the preceding explanations show that the charges Q1 and Q2 are proportionate to Cdl(Cs +Cdp+Cdl). They are therefore fairly small.

The dark current (charges generated by the photodiodes outside the time interval t1, t2) is also transmitted to the columns, multiplied by this very same ratio. It, therefore, does not excessively disturb the reading of a useful charge.

It will be noted, finally, that the photodiode DP, which ensures the photodetection, or the essential part of the photodetection, always stays in reverse bias. This limits the constraints to which it is subjected, and improves the dependability of the circuit.

It is useful to note that, because the diodes connected to the node A have the same bias, it will be technologically easier to make the device than would be the case if a diode anode and diode cathode had to be connected to the same point at a time.

Several modes of operation are possible for this circuit.

In a first mode of operation, the illumination occurs solely during a time interval t1, t2 between two reading pulses. The row-addressing register (DEL) works almost continuously to successively read all the rows after a period of illumination common to all the rows. The illumination is done; then the register scans the rows one after another, to read them; then the illumination is done again, etc.

In a second mode of operation, a bias pulse can be sent simultaneously to all the rows Li, to bias all the floating nodes A of the matrix. Then, the illumination is sent, and then the reading pulses are sent row by row.

In a third embodiment, the illumination is continuous, i.e. in a certain way, t1 gets merged with t0 and t2 with t'0.

The time needed for reading the charges (i.e. the time needed for removing the charge Q3) is all the greater, as the charge Q3 is low, hence all the greater as the illumination received by the photosensitive dot selected for reading is low.

This arises out of the forward resistance of the reading diode DL, which becomes very great as and when the difference in potential between its terminals, namely between the node A and the column Cj, approaches zero.

There should therefore be provision for a reading pulse duration (t3 to t'0) that is sufficient to take the most unfavorable case into account.

One way to accelerate the transfer of charges is to add an additional charge, of a known value, to the useful signal, this additional charge being produced by a diffuse light source which illuminates the photosensitive dots. Thus, even if the useful illumination is null, a systematic illumination will be produced, and a non-null charge will be transferred. It will be enough to deduce a corresponding charge at the output of the reading integrator. Thus, the reading speed is improved for low illumination levels, by transferring a non-null known charge even for a null useful illumination which would normally not give rise to a transfer of charges.

In the case of a matrix used in radiology and coated with a scintillator converting X-rays into rays of visible light, it is possible to add on the auxiliary light source behind the panel and create illumination through the substrate of the matrix. The substrate should then be transparent, as also the conductors deposited on the substrate and covered by the diodes.

Another way is to increase the height of the reading pulse. If VAl is the bias reference level of the floating node before illumination, we have seen that VL1−VL2 is roughly equal to −VAl (overlooking the drop in forward voltage of the diode DL). Provision can also be made for the level of the reading pulse to be VL'1−VL2 greater than −VAl to transfer, even in case of null illumination, a certain quantity of charges corresponding to the difference between VL'1 and VL1. However, at the end of this pulse, the potential of the node A goes to a value VA'1 and not VAl. To return, subsequently, to the same conditions of bias of the floating node at the start of the next reading operation, a quantity of charges is provided to the node A, for example by means of a light flash. Then an intermediate blank reading is done (without there having been any illumination other than this flash) with a reading pulse of a height VL1−VL2 and no longer VL'1−VL2. This makes the potential of the node A return to its normal initial value.

The supplying of charges with a view to blank reading can also be done by biasing one of the diodes, DP or DL, sufficiently in reverse to cause a considerable leakage current to flow and cause the desired supply of charges.

It will be noted that, if this method of reading with an intermediate blank reading step is used, then the useful illumination should be discontinuous and not continuous.

In addition, the following observations can be made: firstly, the row voltages act only by capacitive influence. Their absolute level therefore has no importance. All that counts is the difference VL1−VL2, and not the absolute value of VL2 or VL1.

The row bias voltage VL2 can therefore be chosen in such a way that the voltage at the capacitor CS never changes its sign during an illumination and reading cycle. A reverse biased diode can then be used as a capacitor. There are two possibilities: the potentials VL1 and VL2 are such that the diode replacing the capacitor CS has, as an electrode connected to the floating node A, an electrode of the same nature as the electrode of the diodes DP and DL connected to the same point. In this case, this diode may be illuminated like DP and DL, and its photoelectric current gets added to that of DP and DL. Or else, the potentials VL1 and VL2 are chosen in such a way that the constant reverse bias of the diode replacing the capacitor CS makes it necessary for the electrode of this diode, connected to the node A, to be an electrode different from the electrodes of DP and DL connected to the same point. Care should then be taken to see to it that the diode replacing the capacitor CS is kept in darkness.

The photosensitive diode may be a PIN diode (with the superimposition of a P type semiconductor layer, an intrinsic semiconductor layer and an N type layer), or a NIPIN or PINIP type diode with five layers, having two intrinsic layers, one of which is very thin while the other is thicker. The light detection sensitivity is thereby improved. In this case, the cathode of the photodiode is the N layer adjacent to the thickest intrinsic layer, and the anode of the photodiode is the P layer adjacent to the thickest intrinsic layer.

What is claimed is:

1. A matrix of photosensitive dots comprising:
a network of photosensitive dots arranged in rows of at least one in number and columns at least one in number, each photosensitive dot being located at the intersection of a row and a column, wherein each photosensitive dot comprises two diodes and one capacitor connected to a floating node, the capacitor being connected between a row conductor and the floating node, a first diode, called a reading diode, being connected between the common floating node and a column conductor to enable the transfer, between this column conductor and the floating node, of a quantity of charges generated on the floating node by the illumination of the photosensitive dot, and a second diode, called a photosensitive diode, being connected between the floating node and a conductor connected to a source of bias voltage wherein said source of bias voltage is different from the column conductor, to generate, when it is illuminated, electrical charges on the floating node, the diodes having respective electrodes which have a corresponding polarity connected to the floating node.

2. A matrix according to claim 1, wherein the source of bias voltage has a value such that the photodiode remains reverse biased throughout the working cycle.

3. A matrix according to claim 1, wherein the source of bias voltage is a source of fixed voltage.

4. A matrix according to one of the claims 1 to 3, wherein a means is provided to carry the row conductors to a first bias voltage during an illumination stage, and to a second reference voltage during a reading stage, and wherein the first voltage and the second voltage are chosen such that the voltage at the terminals of the capacitor keeps the same sign throughout the illumination stage and the reading stage.

5. A matrix according to claim 4, wherein the capacitor is made in the form of a diode that is reverse biased during the illumination stage and the reading stage.

* * * * *